Jan. 30, 1923.　　　　　　　　　　　　　　　　　1,443,585
C. F. MITCHEL ET AL.
PINWHEEL.
FILED MAR. 30, 1922.
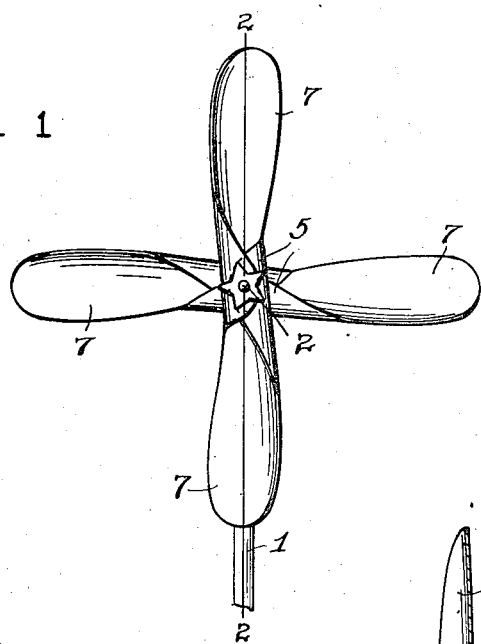
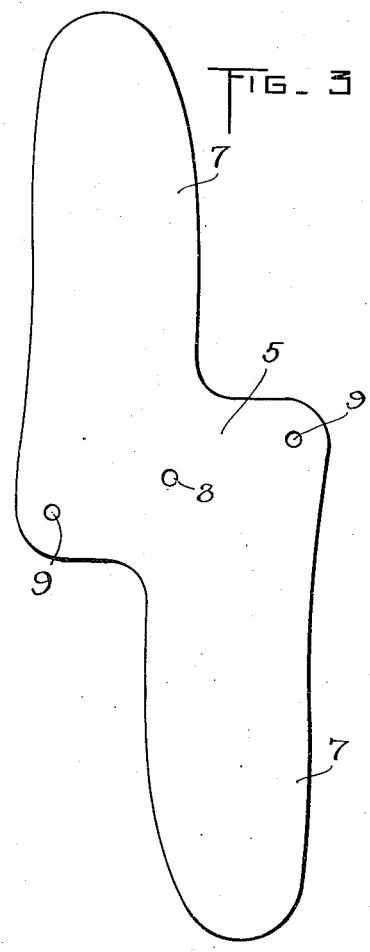
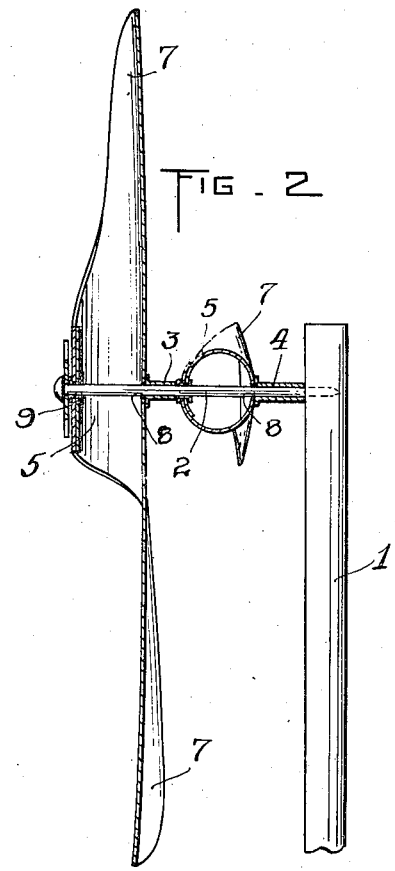
INVENTOR.
Charles F. Mitchel and
James W. Lechleitner
BY
Davis & Swain
ATTORNEYS.

Patented Jan. 30, 1923.

1,443,585

UNITED STATES PATENT OFFICE.

CHARLES F. MITCHEL AND JAMES W. LECHLEITNER, OF ROCHESTER, NEW YORK, ASSIGNOR TO BASTIAN BROS. COMPANY, INC., OF ROCHESTER, NEW YORK, A CORPORATION OF NEW YORK.

PINWHEEL.

Application filed March 30, 1922. Serial No. 547,983.

*To all whom it may concern:*

Be it known that we, CHARLES F. MITCHEL and JAMES W. LECHLEITNER, citizens of the United States, and residents of Rochester, in the county of Monroe and State of New York, have invented certain new and useful Improvements in Pinwheels, of which the following is a specification.

The present invention relates to pin wheels and an object thereof is to provide a construction which will permit the mounting of two oppositely turning wind-propelled devices of substantially the same circle of operation upon a single pin or shaft. A further object of this invention is to provide a pin wheel having two oppositely turning wind propelled devices and constructed so as to be inexpensive to manufacture.

To these and other ends, the invention consists of certain parts and combinations of parts, all of which will be hereinafter described: the novel features being pointed out in the appended claim.

In the drawings:

Fig. 1 is a front view of a pin wheel constructed in accordance with this invention;

Fig. 2 is a section on the line 2—2, Fig. 1; and

Fig. 3 is a plan view of the blank from which the wind propelled devices are made.

Referring more particularly to the drawings, 1 indicates the holder or staff on which the shaft 2 is mounted preferably so that the shaft 2 extends longitudinally of the staff 1. On this shaft 2 wind propelled devices are arranged to turn. These wind propelled devices have their greatest dimensions preferably substantially equal. A spacer 3 is interposed between the two parts of the wind propelled devices and a spacer 4 is interposed between the rearmost wind propelled device and the staff 1.

Each wind propelled device, in this instance, is bi-bladed, this result being secured by providing a central portion 5 and two elongated portions 7, these elongated portions having their longitudinal axes substantially parallel but out of line and one edge of each elongated portion merging into and being substantially in line with the side edge of the central portion 5. The center of the central portion is provided with an opening 8 while the opposite corners of the central portion are provided with openings 9. The corners are rolled so that the openings 9 are alined with the opening 8 and may have the shaft 2 extending therethrough. The blanks for the two wind propelled devices are the same and the turning of the wind propelled devices in opposite directions is secured by bending the ends of the corners of the central portion of one blank in one direction and the corners of the central portion of the other blank in the opposite direction.

Owing to the construction of the bi-bladed propellers, it is possible to make the lengths of the two propellers equal, so that one does not materially interfere with the passage of air to the other. Furthermore, a construction is provided which is inexpensive to manufacture.

What we claim as our invention and desire to secure by Letters Patent is:

A pin wheel having a shaft and two bi-bladed wind propelled devices mounted to turn on the shaft, each device being formed from a blank having a central portion and two elongated portions of less width than the central portion, each being out of line with the other and a side edge being substantially alined with a side edge of the central portion, the opposite corners and the center of the central portion of each blade having an opening through which the shaft extends, the corners of one blank being turned in one direction, while the corners of the blank of the other are turned in the other direction, so that surfaces are provided that cause the rotation of the wind propelled devices in the opposite directions.

CHARLES F. MITCHEL.
JAMES W. LECHLEITNER.